J. T. BUNTING.
HOT WATER HEATER.
APPLICATION FILED SEPT. 22, 1913.
1,136,862.
Patented Apr. 20, 1915.
2 SHEETS—SHEET 1.
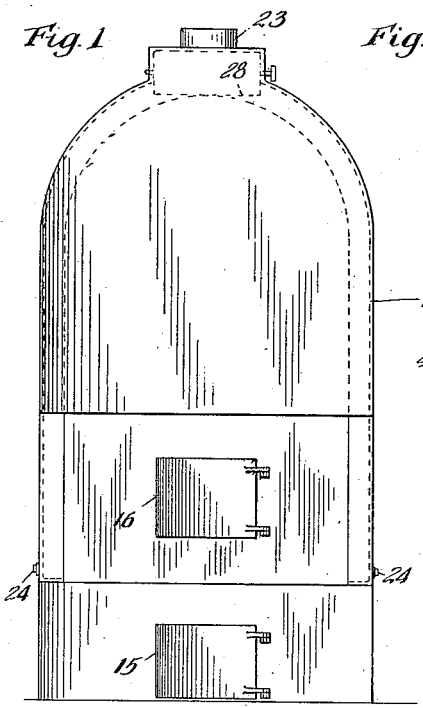
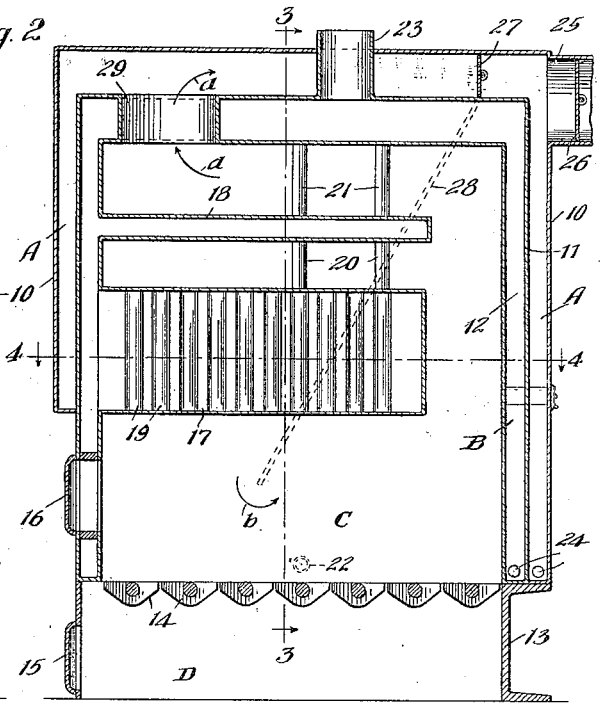
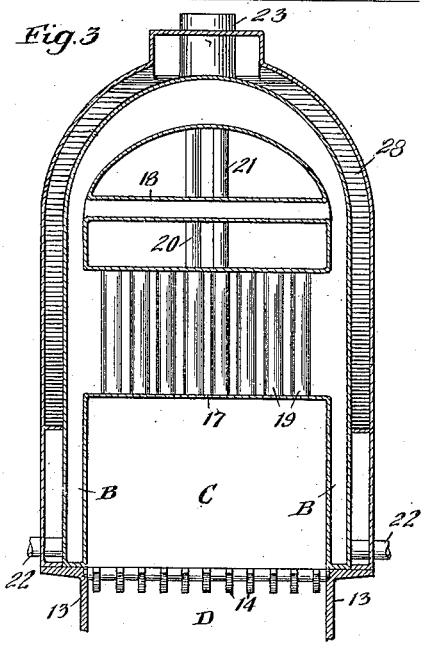
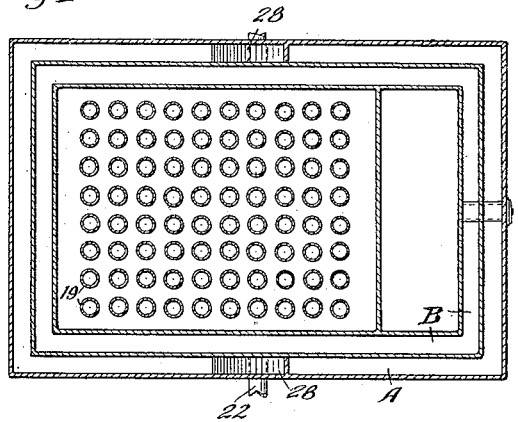
Witnesses:
Wm. Geiger
Esther Abrams.
Inventor:
John T. Bunting
By Munday, Evarts, Adcock & Clarke
Attorneys J. T. BUNTING.
HOT WATER HEATER.
APPLICATION FILED SEPT. 22, 1913.
1,136,862.
Patented Apr. 20, 1915.
2 SHEETS—SHEET 2.
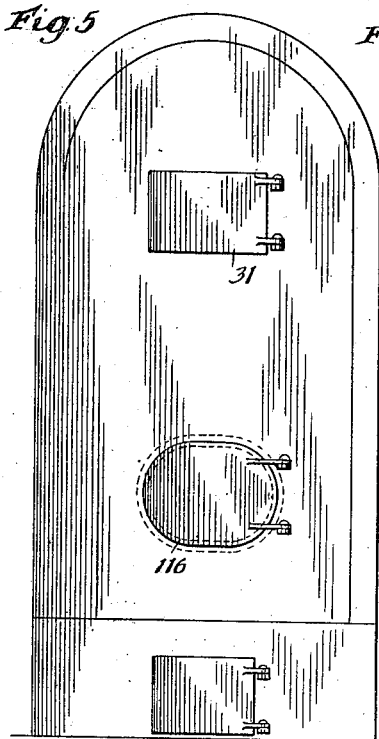
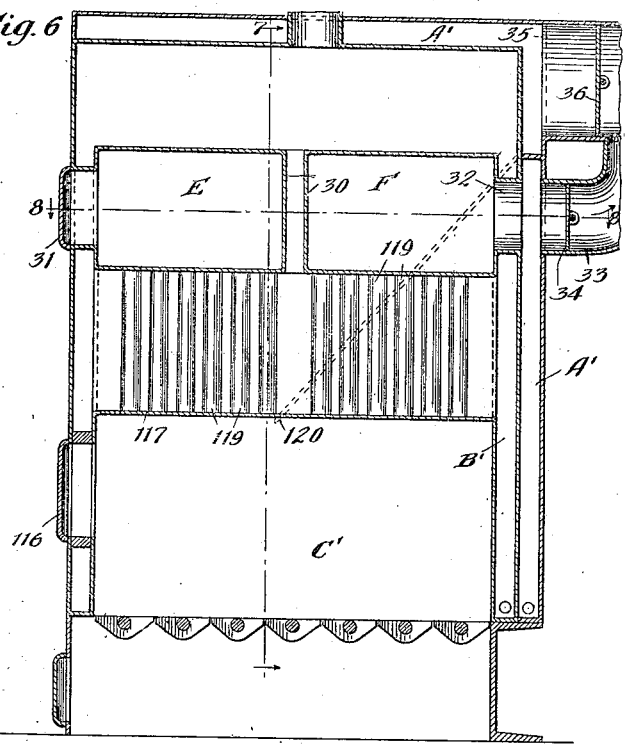
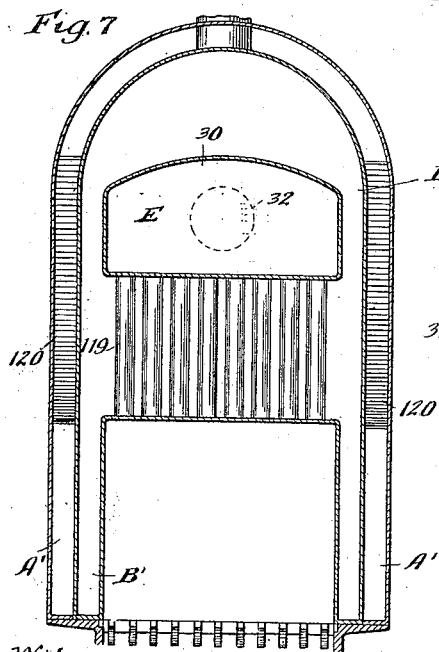
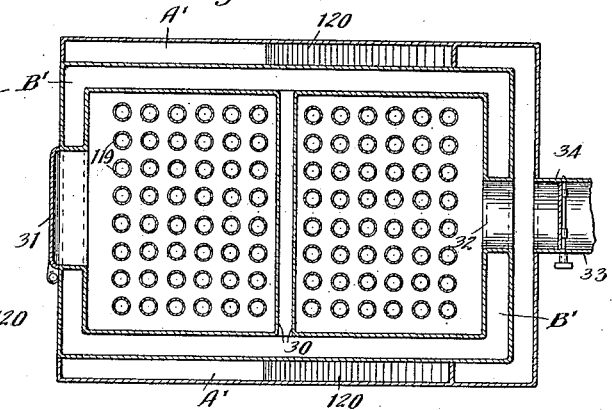
Inventor:
John T. Bunting
By Munday, Evarts, Adcock & Clarke
Attys.
Witnesses:
Wm Geiger
Esther Abrams

UNITED STATES PATENT OFFICE.

JOHN T. BUNTING, OF CHICAGO, ILLINOIS.

HOT-WATER HEATER.

1,136,862.  Specification of Letters Patent.  Patented Apr. 20, 1915.

Application filed September 22, 1913. Serial No. 791,027.

*To all whom it may concern:*

Be it known that I, JOHN T. BUNTING, a citizen of the United States, residing in Chicago, in the county of Cook and State of Illinois, have invented a new and useful Improvement in Hot-Water Heaters, of which the following is a specification.

This invention relates to improvements in hot water heaters.

Objects of the invention are to provide a hot water heater of relatively simple construction which is cheap to manufacture; which is provided with a relatively large amount of direct heating surface and a large amount of indirect heating surface; and which is provided with an optionally operative means governing the outlet of the gases of combustion and so arranged that the gases of combustion may pass to the chimney in a relatively direct path or by a tortuous path.

The invention furthermore consists in the improvements in the parts and devices and in the novel combinations of the parts and devices as herein shown, described or claimed.

In the drawing forming a part of this specification, Figure 1 is a front elevation of a heater embodying my improvements. Fig. 2 is a longitudinal, central, vertical, sectional view of the heater shown in Fig. 1. Fig. 3 is a transverse, vertical, sectional view taken substantially on the line 3—3 of Fig. 2. Fig. 4 is a horizontal, sectional view taken substantially on the line 4—4 of Fig. 2. Fig. 5 is a front end elevation of another form of heater embodying my improvements. Fig. 6 is a central, longitudinal, vertical section of the heater shown in Fig. 5. Fig. 7 is a sectional view taken substantially on the line 7—7 of Fig. 6, and Fig. 8 is a horizontal sectional view taken on the line 8—8 of Fig. 6.

In said drawing, the heater is shown as having an outer shell 10, intermediate shell 11 and inner shell 12 between which are formed an outer heating chamber A and an inner water chamber B, said chambers being substantially co-extensive and forming the front, back, sides and top of the heater, all the parts being supported on a suitable base 13. The interior of the inner shell 12 constitutes the combustion chamber C, at the bottom of which is located a rockable grate 14, which may be of any ordinary construction, and beneath which is located the usual ash pit D. The front of the heater is provided with an ash pit door 15 and fuel feed door 16. Within the combustion chamber C and above the grate 14 are two water boxes or heaters 17 and 18 which extend horizontally and terminate a sufficient distance in front of the rear wall of the shell 12 to thereby provide a passage for the upward flow of the gases of combustion. The lower water box 17 is provided with a plurality of heat flues 19 therethrough and, as will be understood, the water boxes 17 and 18 are each in communication with the water chamber B, both at their sides and at the front, and are furthermore in communication with each other and with the top of the water chamber B by pipes 20 and 21. The return pipes for the water are shown at 22 and the outlet or pipe leading to the radiators to be supplied with hot water is shown at 23. Clean-outs for the heating chamber A and water chamber B may be provided wherever desired as shown at 24. The outside heating chamber A is in communication with a chimney by means of the chimney pipe 25 having a damper 26 therein. In the upper part of the heating chamber A is provided another auxiliary damper 27 and extending from the damper 27 down the sides of the heater and forming baffles in the chamber A are inclined partitions 28.

The operation is as follows: Ordinarily the damper 27 will be left open and some of the gases of combustion will pass up through the heat flues 19 and strike the under side of the hot water heater 18 and the remainder of the gases of combustion will pass up through the passageway formed at the rear end of the heater 17 and all the gases of combustion will then combine and pass up through the opening 29 in the direction indicated by the arrows, *a*, *a*, and out through the chimney pipe 25. Under these conditions, the water receives practically all of its heat directly from the walls of the combustion chamber and the heat flues 19. When, however, a slower burning fire may be desirable and all the heat of the gases of combustion obtained, the damper 27 will be closed, whereupon the products of combustion will be deflected downwardly by the baffles 28 to the bottom of the heating chamber A and around the lower ends of the baffles as indicated by the arrow *b*, after which the gases of combustion will then rise and pass out through the pipe 25. In this way, practically the whole interior surface of the water heater is directly heated and the outer surface is indirectly heated, thereby utilizing all the heat of the fuel.

In the form of heater shown in Figs. 5 to 8 inclusive, the same is shown as having an outer heating chamber A', inner water chamber B' and combustion chamber C'. In this construction, however, only one water box is provided in the combustion chamber, the same being referenced 117 and, as shown, extending the full length and width of the combustion chamber and provided with a plurality of heat flues 119. The chamber above the water box 117 is divided into a front portion E and a rear portion F by means of transversely extending partitions 30. An auxiliary fuel feed door 31 is provided so that certain substances such as paper and the like may be fed into the chamber E on top of the water box 117. In such case, the paper or other like material will be dried and set on fire and the ashes and products of combustion thereof will be drawn down through the heat flues 119 in the front part of the furnace and all the gases of combustion of the entire heater will pass up through the rear flues 119 and out through passageway 32 into the chimney pipe 33 having a damper 34 therein. As will be understood, the ordinary fuel to be burned will be placed in the combustion chamber C' through the door 116.

When the damper 34 is open, the gases of combustion will escape through the pipe 33, as before described, but when the damper 34 is closed, the gases of combustion will be forced downwardly through the side and back portions of the heating chamber A' by the inclined partitions or baffles 120 and after passing around the lower edges thereof will ascend to the top of the heating chamber A' and pass out through the chimney through another chimney pipe 35 having a damper 36 therein. The form of heater shown in Figs. 5 to 8 inclusive, is particularly adapted for apartment houses where quantities of paper and other light waste material has to be burned from day to day, and by placing the paper in the chamber E the same is soon dried and set on fire without the main fire of the heater being affected.

Although I have herein shown and described what I now consider the preferred embodiment of my improvements, yet it will be understood that changes and modifications may be made in the details and arrangements of the parts without departing from the spirit of the invention, and all such changes and modifications are contemplated as come within the scope of the claims appended hereto.

I claim:

1. A heater of the character described having outer intermediate and inner shells forming an outer heating chamber and an inner water chamber, said chambers being substantially co-extensive and constituting side walls of the heater, a combustion chamber within said inner shell, said combustion chamber being in communication with the outer heating chamber by means of a passage through the water chamber, a water heating box within the combustion chamber having a plurality of vertically arranged heating flues therein, said box communicating with said inner water chamber and inclined partitions at the side of the heater in the outer heating chamber forming baffles adapted to direct the heated air downwardly in the outer heating chamber and thence upwardly in contact with the inner water chamber, substantially as specified.

2. A heater of the character described having an outer, intermediate and inner shells forming an outer heating chamber and an inner water chamber, said chambers being substantially co-extensive and constituting the front, back, side and top portions of the heater, a combustion chamber within the inner shell, said combustion chamber being in communication with the outer heating chamber by means of a passage through the water chamber, a water heating box within the combustion chamber having a plurality of vertically arranged heating flues therein, a second water heating box spaced from and located above the first named box, water pipes connecting said boxes with each other and with the top of the water chamber, and inclined partitions on the sides of the heater within the heating chamber, said partitions forming baffles, substantially as specified.

Signed this 18 day of September, 1913, in the presence of two witnesses.

JOHN T. BUNTING.

Witnesses:
WILLIAM A. GEIGER,
JOSEPH HARRIS.

Copies of this patent may be obtained for five cents each, by addressing the "Commissioner of Patents, Washington, D. C."